United States Patent [19]

Hardin

[11] Patent Number: 4,926,697
[45] Date of Patent: May 22, 1990

[54] DIFFERENTIAL PRESSURE TRANSMITTER, A SQUARE ROOT EXTRACTING DEVICE THEREFOR AND METHODS OF MAKING THE SAME

[75] Inventor: George T. Hardin, Knoxville, Tenn.

[73] Assignee: Robertshaw Controls Company, Richmond, Va.

[21] Appl. No.: 297,665

[22] Filed: Jan. 13, 1989

[51] Int. Cl.⁵ .................................................. G01F 1/46
[52] U.S. Cl. ................................................. 73/861.48
[58] Field of Search ......................... 73/861.48, 861.51

[56] References Cited

U.S. PATENT DOCUMENTS

| | | | |
|---|---|---|---|
| 2,672,151 | 3/1954 | Newbold | 73/861.48 |
| 2,992,559 | 7/1961 | Martz et al. | 73/861.48 |
| 3,006,190 | 10/1961 | Jansson | 73/861.48 |
| 4,384,492 | 5/1983 | Kreuter | 73/861.48 |
| 4,833,924 | 5/1989 | Asbill, III | 73/861.48 |

Primary Examiner—Jerry W. Myracle
Attorney, Agent, or Firm—Candor, Candor & Tassone

[57] ABSTRACT

A differential pressure transmitter, a pneumatically operated square root extracting device therefor and methods of making the same are provided, the transmitter having a rod operatively interconnecting a movable wall with a cam roller to cause the roller to roll on a flat surface as the value of the pressure in an output chamber defined by the movable wall changes, the rod and the movable wall respectively having universal joint units snap-fitted together to provide for universal movement therebetween while movement of the wall causes the roller to roll.

6 Claims, 6 Drawing Sheets

DIFFERENTIAL PRESSURE TRANSMITTER, A SQUARE ROOT EXTRACTING DEVICE THEREFOR AND METHODS OF MAKING THE SAME

BACKGROUND OF THE INVENTION

1. Field of the Invention

This invention relates to a new differential pressure transmitter that comprises a linear air velocity transmitter and to a pneumatically operated square root extracting device for such a transmitter or the like as well as to methods of making such a transmitter and/or such a square root extracting device.

2. Prior Art Statement

It is known to provide a differential pressure transmitter comprising means for producing an output pneumatic signal from a pneumatic source in relation to the air velocity pressure of air flowing in a passage, means for sensing the difference between the total pressure and the static pressure of the air flowing in the passage, and means for extracting the square root of the air velocity pressure of the air from the pneumatic output signal as the pneumatic output signal is being produced so that the pneumatic output signal is substantially linear with respect to the air velocity of the air flow in the passage whereby the transmitter comprises a linear air velocity transmitter, the means for extracting the square root comprising a cam having a cam face that defines at least part of the involute of a circle, a roller having a surface that defines a substantially circular transverse cross-sectional configuration, the roller carrying the cam so that the cam rotates as the roller rolls on the surface thereof, a flat surface engaged by the surface of the roller so that the roller can roll on the flat surface, a movable wall carried by the transmitter and defining an output signal chamber therewith whereby the position of the wall is determined by the value of the pressure in the output signal chamber, rod means operatively interconnecting the wall to the roller to roll the roller on the flat surface as the value of the pressure in the output chamber changes, and a cable, the means for producing the output signal comprising a bleed nozzle carried by the transmitter and a flapper lever pivotally carried by the transmitter for controlling the bleed nozzle, the means for sensing the difference between the total pressure and the static pressure comprising a housing having a pair of chambers separated from each other by a flexible diaphragm whereby one of the chambers is for receiving the total pressure therein and the other of the chambers is for receiving the static pressure therein, the flexible diaphragm having a post that is operatively interconnected to the flapper lever to transmit movement of the diaphragm to the flapper lever which will produce the output pneumatic signal with the nozzle, the cam face of the cam being operatively interconnected to the flapper lever by the cable, the cable having opposed ends one of which is operatively interconnected to the flapper lever and the other of which is secured to the cam face in such a manner that the cable is wound onto the cam face as the roller rolls on the flat surface in one direction and is unwound from the cam face as the roller rolls on the flat surface in the opposite direction to the one direction. For example, see the copending patent application of Clarence M. Asbill, III, Ser. No. 114,789, filed Oct. 30, 1987, now U.S. Pat. No. 4,833,924.

Also see the U.S. Pat. No. 4,384,492 to Kreuter which discloses another differential pressure transmitter.

It is also known to provide a differential pressure transmitter comprising means for producing an output pneumatic signal from a pneumatic source in relation to the air velocity pressure of air flowing in a passage, means for sensing the difference between the total pressure and the static pressure of the air flowing in the passage, and means for extracting the square root of the air velocity pressure of the air from the pneumatic output signal as the pneumatic output signal is being produced so that the pneumatic output signal is substantially linear with respect to the air velocity of the air flow in the passage whereby the transmitter comprises a linear air velocity transmitter, the means for extracting the square root comprising a cam arrangement, a movable wall carried by the transmitter and defining an output signal chamber therewith whereby the position of the wall is determined by the value of the pressure in the output signal chamber, the wall being operatively interconnected to the cam arrangement to operate the cam arrangement as the value of the pressure in the output chamber changes, the means for producing the output pneumatic signal comprising a bleed nozzle carried by the transmitter and a flapper lever pivotally carried by the transmitter for controlling the bleed nozzle, the means for sensing the difference between the total pressure and the static pressure comprising a housing having a pair of chambers separated from each other by a flexible diaphragm whereby one of the chambers is for receiving the total pressure therein and the other of the chambers is for receiving the static pressure therein, the flexible diaphragm having a post that is operatively interconnected to the flapper lever to transmit movement of the diaphragm to the flapper lever which will produce the output pneumatic signal with the nozzle, the cam arrangement being operatively interconnected to the flapper lever, the housing having two like end diaphragms disposed on opposite sides of the flexible diaphragm and provided with outer peripheries respectively secured to the housing and inner peripheries respectively secured to two parts of the post whereby the end diaphragms respectively cooperate with the flexible diaphragm to define the pair of chambers therebetween. For example, see the aforementioned copending patent application of Clarence M. Asbill, III, Ser. No. 114,789, filed Oct. 30, 1987.

Also see the aforementioned U.S. Pat. No. 4,384,492 to Kreuter, for another differential pressure transmitter.

SUMMARY OF THE INVENTION

It is one feature of this invention to provide a new differential pressure transmitter that will act as a linear air velocity transmitter.

In particular, it was found according to the teachings of this invention that the square root extracting device of a differential pressure transmitter can utilize a unique snap-fitting universal joint means for interconnecting a movable wall of the transmitter to a rod means that transmits movement of that movable wall to a cam arrangement of the transmitter.

Accordingly, one embodiment of this invention provides a differential pressure transmitter comprising means for producing an output pneumatic signal from a pneumatic source in relation to the air velocity pressure of air flowing in a passage, means for sensing the difference between the total pressure and the static pressure of the air flowing in the passage, and means for extracting the square root of the air velocity pressure of the air from the pneumatic output signal as the pneumatic output signal is being produced so that the pneumatic output signal is substantially linear with respect to the air velocity of the air flow in the passage whereby the transmitter comprises a linear air velocity transmitter, the means for extracting the square root comprising a cam having a cam face that defines at least part of the involute of a circle, a roller having a surface that defines a substantially circular transverse cross-sectional configuration, the roller carrying the cam so that the cam rotates as the roller rolls on the surface thereof, a flat surface engaged by the surface of the roller so that the roller can roll on the flat surface, a movable wall carried by the transmitter and defining an output signal chamber therewith whereby the position of the wall is determined by the value of the pressure in the output signal chamber, rod means operatively interconnecting the wall to the roller to roll the roller on the flat surface as the value of the pressure in the output chamber changes, and a cable, the means for producing the output pneumatic signal comprising a bleed nozzle carried by the transmitter and a flapper lever pivotally carried by the transmitter for controlling the bleed nozzle, the means for sensing the difference between the total pressure and the static pressure comprising a housing having a pair of chambers separated from each other by a flexible diaphragm whereby one of the chambers is for receiving the total pressure therein and the other of the chambers is for receiving the static pressure therein, the flexible diaphragm having a post that is operatively interconnected to the flapper lever to transmit movement of the diaphragm to the flapper lever which will produce the output pneumatic signal with the nozzle, the cam face of the cam being operatively interconnected to the flapper lever by the cable, the cable having opposed ends one of which is operatively interconnected to the flapper lever and the other of which is secured to the cam face in such a manner that the cable is wound onto the cam face as the roller rolls on the flat surface in one direction and is unwound from the cam face as the roller rolls on the flat surface in the opposite direction to the one direction, the rod means and the movable wall respectively having universal joint means snap-fitted together to provide for universal movement therebetween while movement of the wall causes the roller to roll on the flat surface.

It is another feature of this invention to provide a new differential pressure transmitter that has unique means for substantially eliminating a static pressure effect in the three-diaphragm system thereof.

In particular, it was found according to the teachings of this invention that it is desirable to have the effective areas of the diaphragm seals at each end of the post be substantially equal to each other and that this can be accomplished by making the post of two parts with one of the parts being axially adjustable relative to the other part and by having the inner peripheries of the two end diaphragms respectively secured to the two parts of the post means.

For example, another embodiment of this invention provides a differential pressure transmitter comprising means for producing an output pneumatic signal from a pneumatic source in relation to the air velocity pressure of air flowing in a passage, means for sensing the difference between the total pressure and the static pressure of the air flowing in the passage, and means for extracting the square root of the air velocity pressure of the air from the pneumatic output signal as the pneumatic output signal is being produced so that the pneumatic output signal is substantially linear with respect to the air velocity of the air flow in the passage whereby the transmitter comprises a linear air velocity transmitter, the means for extracting the square root comprising a cam arrangement, a movable wall carried by the transmitter and defining an output signal chamber therewith whereby the position of the wall is determined by the value of the pressure in the output signal chamber, the wall being operatively interconnected to the cam arrangement to operate the cam arrangement as the value of the pressure in the output chamber changes, the means for producing the output pneumatic signal comprising a bleed nozzle carried by the transmitter and a flapper lever pivotally carried by the transmitter for controlling the bleed nozzle, the means for sensing the difference between the total pressure and the static pressure comprising a housing having a pair of chambers separated from each other by a flexible diaphragm whereby one of the chambers is for receiving the total pressure therein and the other of the chambers is for receiving the static pressure therein, the flexible diaphragm having a post that is operatively interconnected to the flapper lever to transmit movement of the diaphragm to the flapper lever which will produce the output pneumatic signal with the nozzle, the cam arrangement being operatively interconnected to the flapper lever, the housing having two like end diaphragms disposed on opposite sides of the flexible diaphragm and provided with outer peripheries respectively secured to the housing and inner peripheries respectively secured to two parts of the post whereby the end diaphragms respectively cooperate with the flexible diaphragm to define the pair of chambers therebetween, the two parts of the post being axially adjustable relative to each other whereby the axial adjustment of one of the parts relative to the other of the parts changes the axial position of the inner periphery of its respective end diaphragm relative to its outer periphery.

Accordingly, it is an object of this invention to provide a new differential pressure transmitter having one or more of the novel features of this invention as set forth above or hereinafter shown or described.

Another object of this invention is to provide a new method of making such a differential pressure transmitter, the method of this invention having one or more of the novel features of this invention as set forth above or hereinafter shown or described.

Another object of this invention is to provide a new pneumatically operated square root extracting device having one or more of the novel features of this invention as set forth above or hereinafter shown or described.

Another object of this invention is to provide a new method of making such a pneumatically operated square root extracting device, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
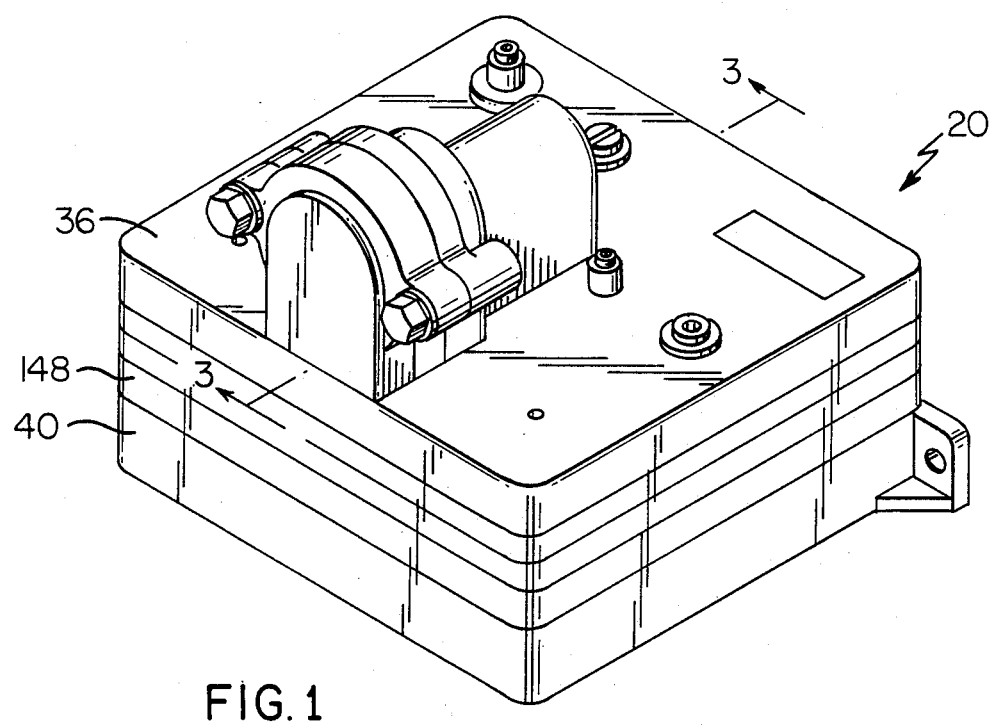
FIG. 1 is a top perspective view of the new differential pressure transmitter of this invention.

While the various features of this invention are hereinafter described and illustrated as being particularly adapted to provide a linear air velocity transmitter, it is to be understood that the various features of this invention can be used singly or in various combinations thereof to provide a pneumatically operated control device for other purposes as desired.

Therefore, this invention is not to be limited to only the embodiment illustrated in the drawings, because the drawings are merely utilized to illustrate one of the wide variety of uses of this invention.

Figure 2:
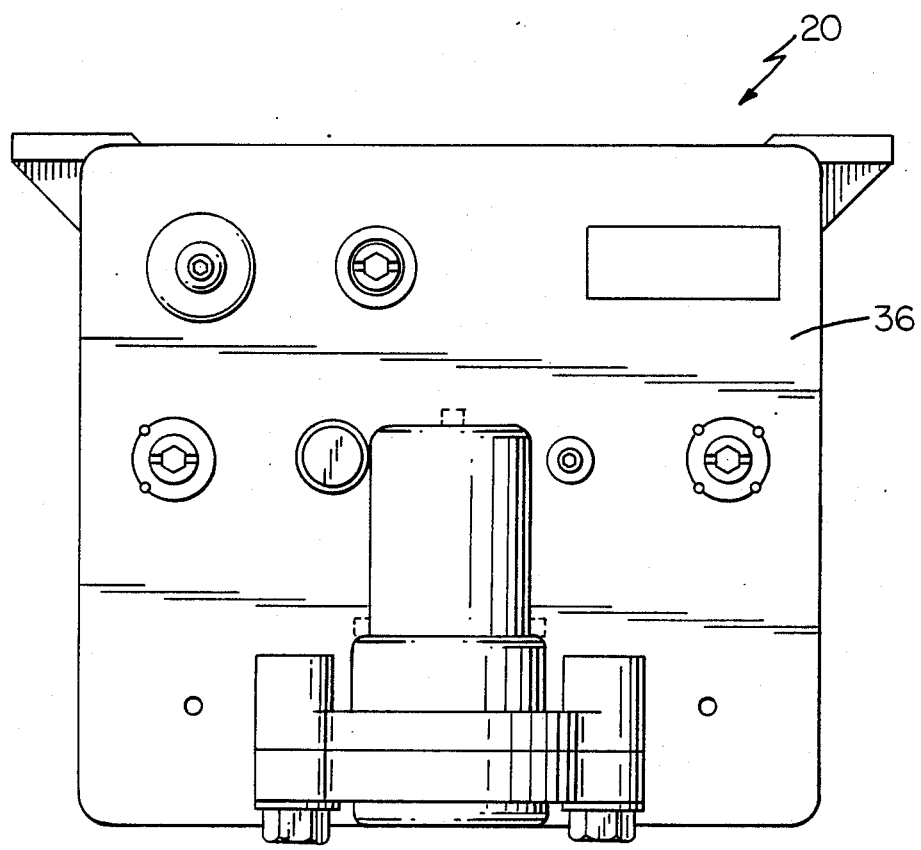
FIG. 2 is an enlarged top view of the differential pressure transmitter illustrated in FIG. 1.
Figure 3:
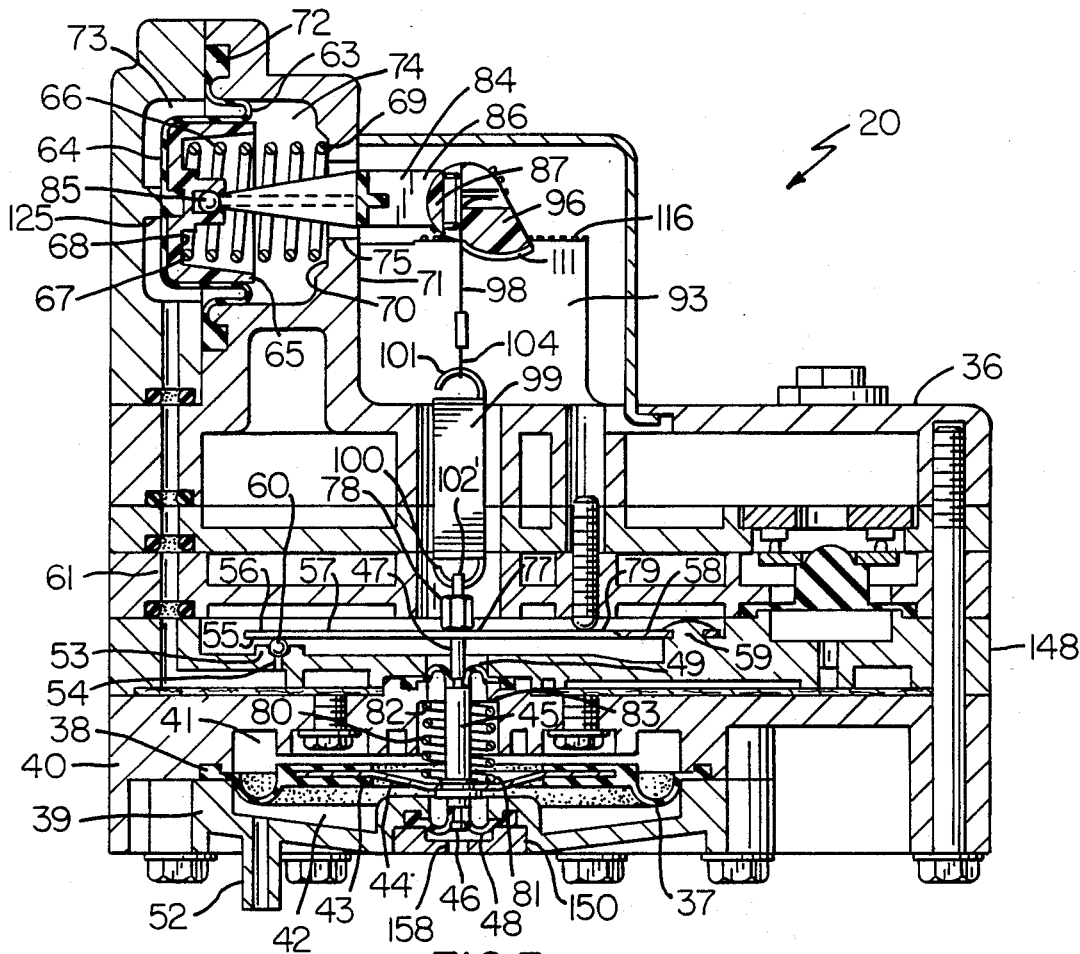
FIG. 3 is an enlarged cross-sectional view taken on line 3—3 of FIG. 1.
Figure 4:
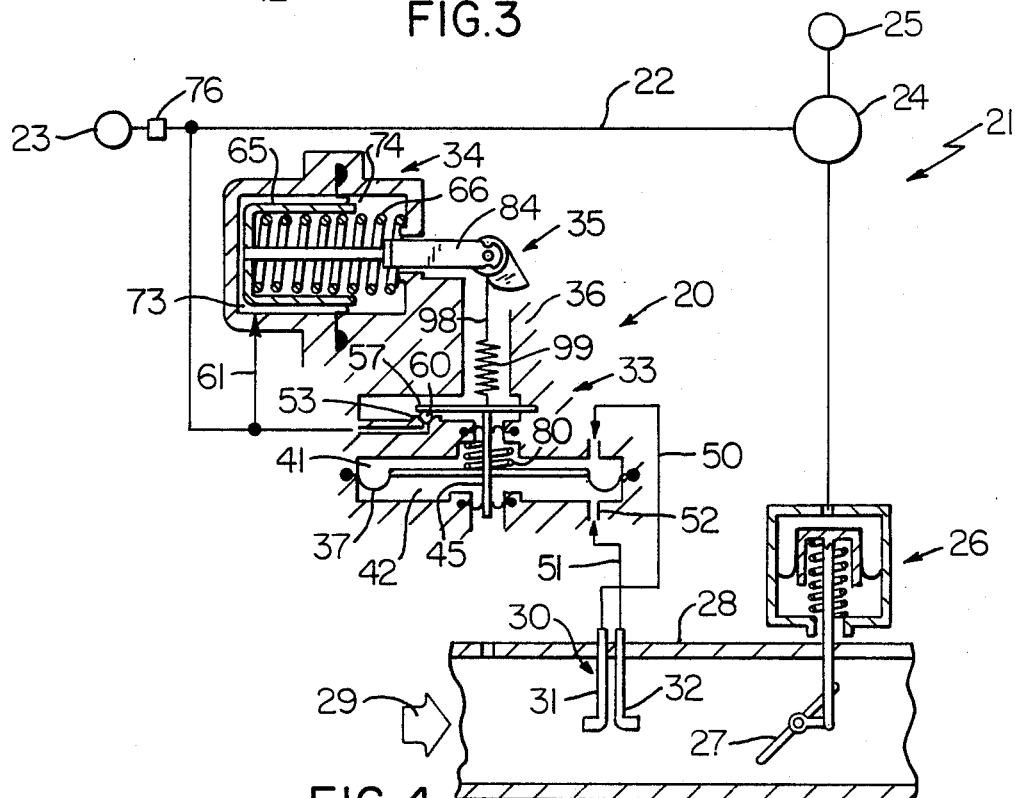
FIG. 4 is a schematic view illustrating the new differential pressure transmitter of this invention being utilized in a system of this invention.

Referring now to FIGS. 1–3, the new differential pressure transmitter of this invention is generally indicated by the reference numeral 20 and is shown schematically in FIG. 4 for controlling a system that is generally indicated by the reference numeral 21, the transmitter 20 being adapted to provide a substantially linear output signal in a conduit means or passage 22 that leads from a pneumatic pressure source 23 to a pneumatically operated controller 24 that is adapted to interconnect another pressure source 25 to a pneumatically operated damper control means 26 that positions a damper 27 located in a duct or passage defining means 28 so as to control the air flow through the duct 28 that is represented by the arrow 29 in FIG. 4.

The air velocity in the duct 28 is measured by a pitot tube arrangement that is generally indicated by the reference numeral 30 and comprises a tube 31 that is disposed in the passage defining means 28 and that senses the total pressure of the air velocity 29 in the duct 28 in a manner well known in the art and a tube 32 that is also disposed in the duct 28 and that senses the static pressure of the air 29 flowing in the duct or passage defining means 28 in a manner well known in the art.

The pressure differential transmitter 20 of this invention comprises a differential pressure measuring portion or means that is generally indicated by the reference numeral 33 in FIG. 4, an output pneumatic signal producing portion or means that is generally indicated by the reference numeral 34 in FIG. 4 and a square root extracting portion or means that is generally indicated by the reference numeral 35 in FIG. 4.

Since the use of a differential pressure transmitter for controlling air flow through a duct with the transmitter having a differential pressure measuring portion, an output pneumatic signal producing portion and a square root extracting portion is set forth in the aforementioned U.S. Pat. No. 4,384,492 to Kreuter, and the aforementioned copending U.S. patent application of Clarence M. Asbill, III, Ser. No. 114,789, filed Oct. 30, 1987 whereby this patent and this copending patent application are being incorporated into this disclosure by this reference thereto, a further discussion of the reasons for the use of the transmitter 20 in connection with the duct means 28 will not be set forth. However, the details of the structure and the operation of the transmitter 20 of this invention will now be described.

As illustrated in FIGS. 3 and 4, the transmitter 20 of this invention comprises a housing means 36 that is formed from a plurality of parts that are suitably interconnected together in a manner well known in the art and as illustrated in the drawings with the housing means 36 containing the differential pressure measuring portion 33, the output pneumatic signal producing portion 34 and the square root extracting portion 35. However, it is to be understood that the various parts of the transmitter 20 could be individually housed and arranged separately while being fluidly interconnected together by suitable passage means if desired The means 33 for measuring the differential pressure comprises a flexible diaphragm 37 having its outer periphery 38 secured between a pair of housing parts 39 and 40 to cooperate therewith to define a pair of chambers 41 and 42 on opposite sides of the diaphragm 37, the inner periphery 43 of the diaphragm being interconnected by a diaphragm plate 44 to a centrally disposed post means 45. The post means 45 thereby moves in unison with the main flexible diaphragm 37 and has opposed ends 46 and 47 respectively secured in sealing relation to the housing parts 39 and 40 by sealing and balancing flexible diaphragms 48 and 49 that respectively cooperate with the main flexible diaphragm 37 to define the chambers 42 and 41 on opposite sides thereof as will be more fully hereinafter illustrated and described.

The chamber 41 of the transmitter 20 is adapted to be interconnected to the tube 31 that senses the total pressure of the air 29 flowing in the duct 28 by having a suitable conduit means 50 connected to an inlet port means (not shown) of the housing means 36 and that leads to the chamber 41 in a manner well known in the art. The tube 32 that senses the static pressure of the air 29 flowing in the duct 28 is adapted to be interconnected by a conduit means 51 to an inlet port means 52 of the housing part 39 that leads to the chamber 42.

In this manner, the diaphragm means 37 and, thus, the post means 45 is positioned in the transmitter 20 in relation to the difference between the total pressure in the chamber 41 and the static pressure in the chamber 42 so as to cause the output pneumatic signal producing means 34 to produce a signal in relation to the position of the post means 45 in a manner hereinafter described.

A nozzle means 53 is carried by the housing means 36 of the transmitter 20 and has a nozzle opening or outlet 54 directed toward the underside 55 of a free end 56 of a flapper lever or baffle 57 that has its other end 58 pivotally mounted to the housing means 36 by a suitably arranged fulcrum post means 59 in a manner well known in the art whereby the free end 56 of the flapper lever 57 is adapted to tend to hold a sealing ball 60 in the nozzle opening 54 in a manner to control the bleed rate of fluid out of the nozzle means 53 in a manner well known in the art depending upon the force imposed on the flapper lever 57 also in a manner well known in the art.

The nozzle means 53 has its outlet 54 disposed in fluid communication with an internal passage means 61 of the housing means 36 that leads to the output pneumatic signal producing means 34, the passage means 61 also being adapted to be interconnected to the conduit means 22 of the system 21 by a branch conduit means 62 in a manner well known in the art whereby it can be seen that the nozzle means 53, in effect, controls the value of the pressure fluid that is adapted to be delivered by the source 23 to the damper control means 24 in relation to the position of the post means 45 as will be apparent hereinafter.

The output pneumatic signal producing means 34 of the transmitter 20 comprises a flexible diaphragm means or movable wall 63 that has its medial portion 64 carrying a rigid cup-shaped member 65 that is urged to the left in FIGS. 3 and 4 by a compression spring 66 that has one end 67 thereof bearing against an end wall 68 of the cup-shaped member 65 and another end 69 bearing against a side 70 of a wall 71 of the housing means 36. The diaphragm or movable wall 63 has an outer peripheral portion 72 carried by the housing means 36 in such a manner that the diaphragm 63 defines chambers 73 and 74 on opposite sides of the diaphragm 63, the chamber 73 being disposed in fluid communication with the passage means 61 leading from the nozzle means 53 for a purpose hereinafter set forth while the chamber 74 is interconnected to the exterior of the housing means 36 by an opening means 75 that passes through the wall 71 as illustrated.

The conduit means 22 that leads from the pneumatic source 23 to the damper controlling actuator 24 has a suitable restriction means 76 therein intermediate the source 23 and the point where the conduit means 62 joins with the conduit means 22 so that the conduit means 22 downstream from the branch conduit 62 is adapted to direct the substantially linear output pneumatic signal as controlled by the signal producing means 34 to the controller 24 in a manner well known in the art and as will be apparent hereinafter. Thus, it can be seen that the pressure fluid being directed through the conduit means 22 to the damper controller means 24 is under the control of the amount of bleed provided by the flapper lever 57 relative to the nozzle means 53 as is also well known in the art.

The end 47 of the post means 45 of the means 33 for measuring the differential pressure is operatively interconnected to the flapper lever 57 at a point 77 thereof that is intermediate the ends 56 and 58 thereof by the end 47 passing through a suitable opening (not shown) at the point 77 of the lever 57 and having an enlarged nut 78 or the like disposed thereon so as to engage against the upper side 79 of the lever 57. A compression spring 80 is disposed in the chamber 41 and has one end 81 bearing against the diaphragm plate 44 and the other end 82 thereof bearing against a shoulder 83 of the housing means 36 so that the force of the compression spring 80 tends to move the diaphragm 37 downwardly in FIGS. 3 and 4 and, thus, move the post means 45 downwardly so that the nut 78 on the post means 45 tends to pull the lever 57 downwardly until the end 56 of the lever 57 fully seats the ball 60 in the outlet opening 54 of the nozzle means 53 to tend to prevent any bleed of fluid out of the outlet means 54, such fully seated position of the ball 60 being the "at rest position" of the transmitter 20 as will be apparent hereinafter. However, such downward movement of the lever 57 by the force of the compression spring 80 is resisted by the force of the pressure fluid in the chamber 73 of the signal producing means 34 tending to move the ball member 60 off of its seat with the opening 54 as is well known in the art and the downward force of the compression spring 80 is also in opposition to the force generated by the square root extractor means 35 in a manner hereinafter set forth.

Figure 8:
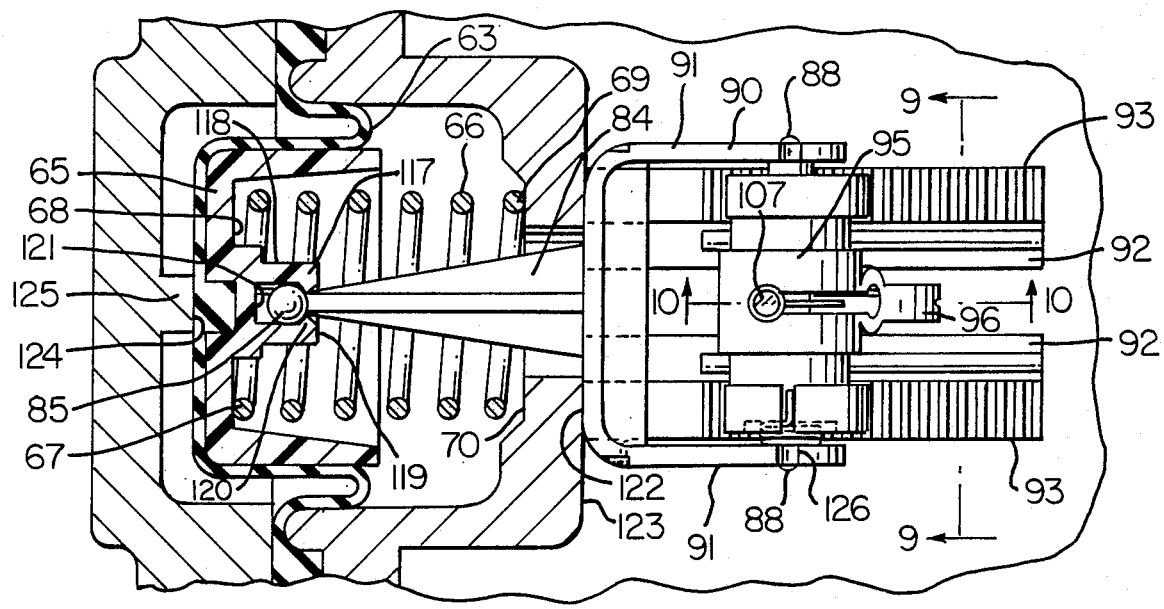
FIG. 8 is a fragmentary cross-sectional view taken on line 8—8 of FIG. 5.
Figure 11:
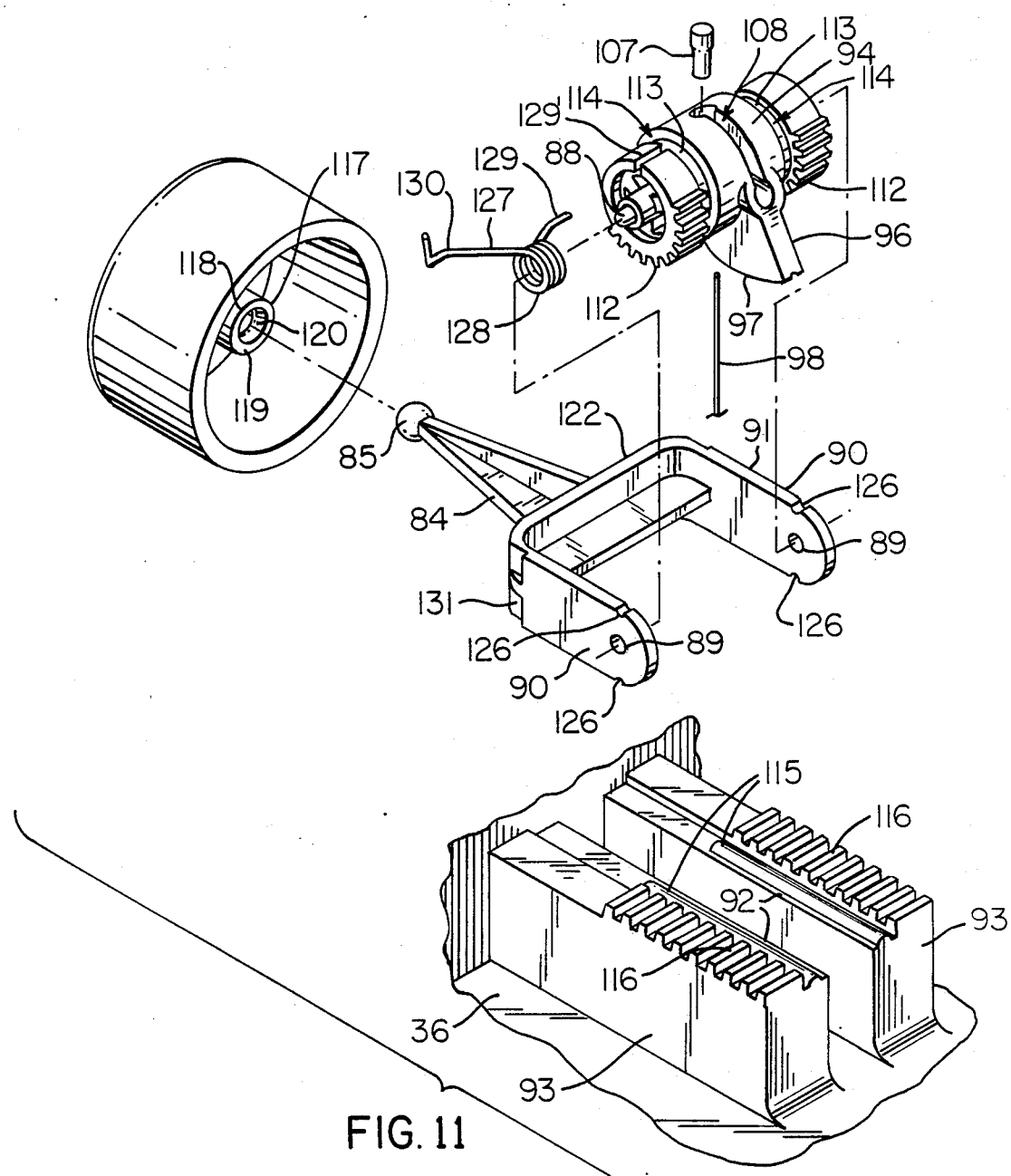
FIG. 11 is a fragmentary exploded perspective view of various parts of the portion of the transmitter of this invention that is illustrated in FIG. 5.

In this manner, the differential pressure measuring means 33 of the transmitter 20 is operatively interconnected to the flapper lever 57 to control the movement thereof as will be apparent hereinafter and, thus, is operatively interconnected to the output pneumatic signal producing means 34 as the pressure value in the chamber 73 thereof is determined by the pressure value permitted by the flapper lever 57 in relation to the position of its end 56 relative to the nozzle output 54 as is well known in the art. Thus, the pressure in the chamber 73 of the output pneumatic signal producing means 34 can cause the diaphragm 63 to move to the right in FIGS. 3 and 4 in opposition to the force of the compression spring 66 as the pressure value in the chamber 73 increases and will cause the diaphragm 63 to move to the left under the force of the compression spring 66 as the pressure value in the chambers 73 decreases. This movement of the movable wall 63 of the output pneumatic signal producing means 34 is translated to a movable rigid rod means or bail 84 that has one end 85 uniquely fastened to the end wall 68 of the cup-shaped member 65 in a manner hereinafter set forth and the other end 86 thereof interconnected to a roller means 87 of the square root extractor means 35 for a purpose hereinafter described, the rod means 84 passing through the opening 75 in the wall 71 of the housing means 36 as illustrated and being interconnected to the roller means 87 by receiving oppositely directed center pivot pins 88, FIGS. 8, 9 and 11, of the roller means 87 in cooperating openings 89 of spaced apart legs 90 of a U-shaped portion 91 of the rod means 84 so that the roller means 87 can roll or rotate relative to the end 86 of the rod means 84 in a manner hereinafter set forth. The movement of the rod means 84 is maintained substantially parallel to a flat surface means 92 of a pair of upstanding rails 93 of the housing means 36 on which a substantially circular surface means 94 of the roller means of the square root extracting device 35 is adapted to roll as will be apparent hereinafter.

The roller means 87 of the square root extracting means 35 comprises a substantially cylindrical member 95 that has the substantially circular cross-sectional configuration 94 throughout the length thereof with such circle 94 also being represented by the line 94 in FIG. 12 for a purpose hereinafter set forth.

A cam member 96 is formed integrally with the roller means 87 and extends medially of the central portion 95 thereof so as to move in unison with the roller means 87, the cam member 96 having a cam face 97 that defines part of the involute of the circle 94 and provides the square root extracting funciton for the transmitter 20 as fully disclosed and claimed in the aformentioned co-pending patent application of Clarence M. Asbill, III, Ser. No. 114,789, filed Oct. 30, 1987.

In particular, the cam face 97 of the roller 87 is operatively interconnected to the flapper lever 57 by a non-stretchable cable 98 and a tension spring 99, the tension spring having opposed ends 100 and 101 with the end 100 being effectively interconnected to the end 47 of the post means 45 by being looped through a suitable opening 102 in a part 102' of the nut 78 that extends outboard of the nut 78 as illustrated in FIGS. 3 and 13-16. The cable 98 has opposed ends 103 and 104 with the end 103 of the cable 98 being effectively attached to a point 105 on the cam face 97 which comprises the point of origin from which the cam face 97 is developed as being the involute of the circle 94 as will be apparent hereinafter, the end 103 of the cable 98 extending vertically upwardly in FIG. 10 through a vertical opening 106 formed through the cylindrical portion 95 of the roller 87 and being held therein by a cylindrical pin 107 that has been driven into the opening 106 after the end 103 of the cable 98 has been bent at a 90° angle to the opening 106 through a slot means 108 and transverse opening 109 formed in the central portion 95 as illustrated whereby the end 103 of the cable 98 is firmly fastened to the roller 87.

Figure 5:
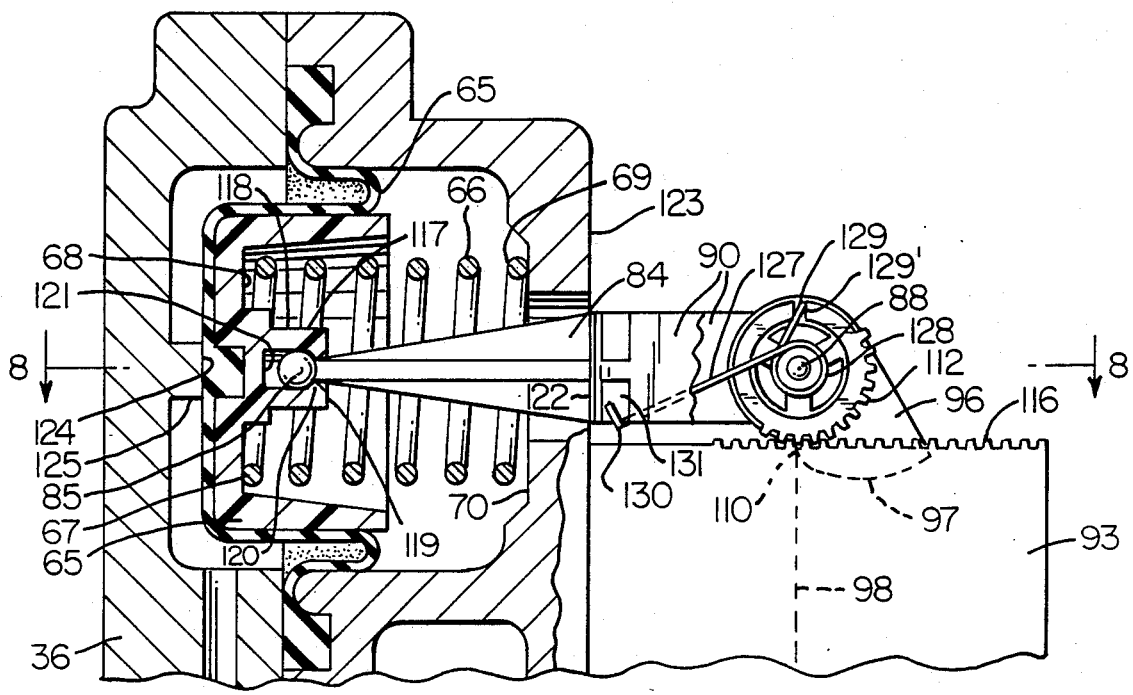
FIG. 5 is an enlarged fragmentary view of an upper portion of the differential pressure transmitter of FIG. 3.
Figure 7:
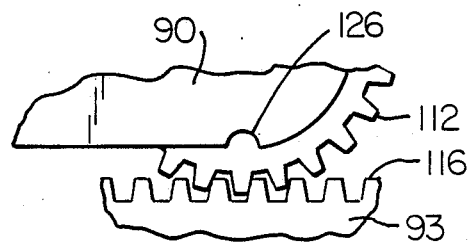
FIG. 7 is an enlarged fragmentary view of a pinion gear portion of the roller and its cooperating gear rack means.

The point of origin 105 of the cam face 97 also defines a reference point or line 110, FIG. 5, on the surface means 92 of the rails 93 of the housing means 36 through which the cable 98 will always extend despite the amount of the cable 98 that is wound on the cam face 97 as the roller means 87 rolls from the position of FIG. 3 to the right. This is because the other end 104 of the cable 98 is interconnected to the end 101 of the tension spring 99 in any suitable manner so that the cable 98, tension spring 99 and post means 45 are all disposed in substantially a coaxially straight-lined relation throughout the entire normal range of operation of the transmitter 20 as will be apparent hereinafter.

Figure 10:
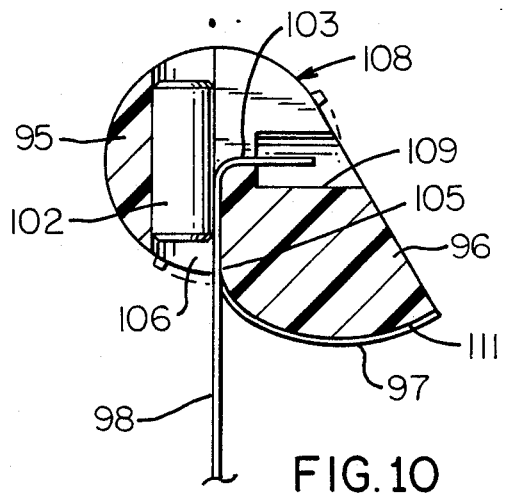
FIG. 10 is a fragmentary cross-sectional view taken on line 10—10 of FIG. 8.

In order to ensure that the cable 98 will be properly held in its wound up relation on the cam face 97 of the cam member 96 as the roller means 87 rolls on the surface means 92, the cam face 97 can be provided with a groove 111 therein that readily receives the cable 98 therein in a manner illustrated in FIG. 10, the bottom of the groove 111, if used, actually defining at least part of the involute of the circle described by the roller means 87 rather than the cam face 97 whereby the bottom of the groove 111 actually comprises the cam face of this invention.

Figure 9:
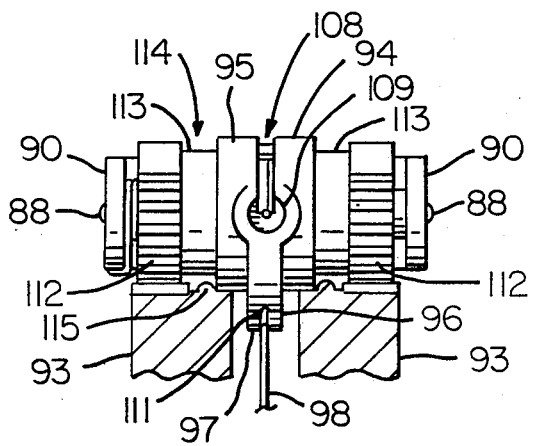
FIG. 9 is a fragmentary cross-sectional view taken on line 9—9 of FIG. 8.

In order to ensure that the roller means 87 will roll on the flat surface means 92 of the housing means 36 without any slippage therebetween, the roller means 87 is provided with a pair of like pinion gear portions 112 respectively disposed spaced from the medial cylindrical portion 95 thereof by reduced cylindrical portions 113 which respectively define annular grooves 114 that receive guide projections 115 on the surfaces 92 so as to center the cylindrical portion 95 of the roller 87 on the flat surfaces 92 of the rails 93 in the manner fully illustrated in FIG. 9 while the pinion gear portions 112 respectively mesh with rack-like gear portions 116 formed on the rails 93 and cooperating therewith in a manner hereinafter set forth.

Figure 6:
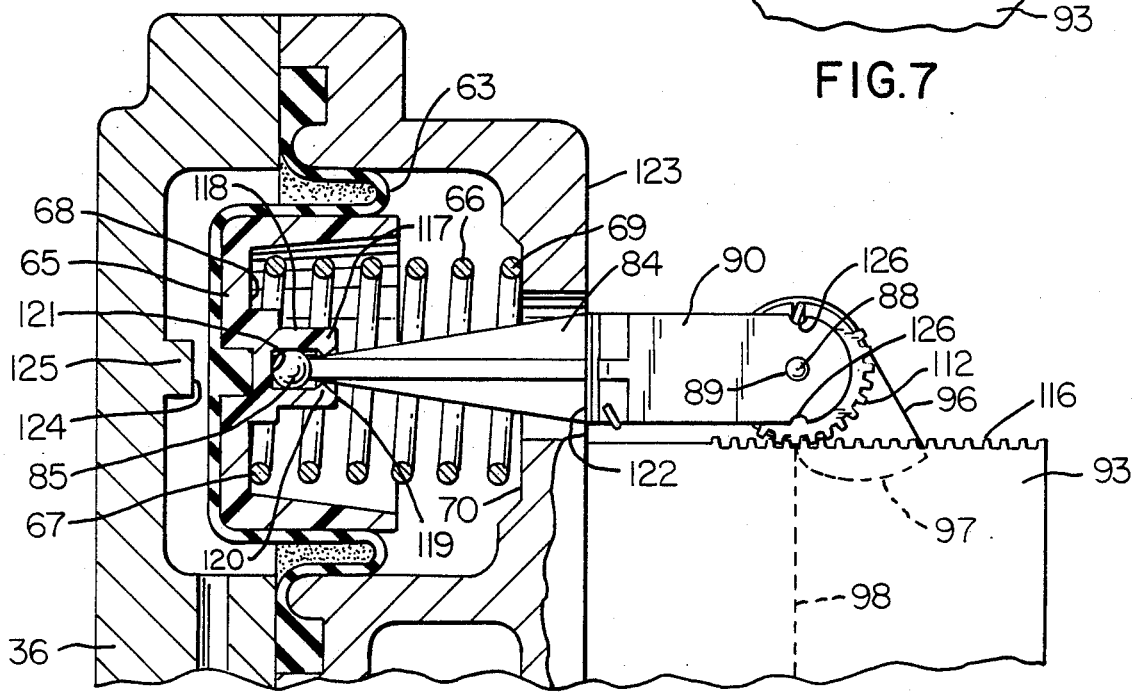
FIG. 6 is a view similar to FIG. 5 and illustrates the transmitter in another operating position thereof.

The cup-shaped member 65 of the movable wall 63 has a snap-fit means 117 that comprises a centrally disposed substantially cylindrical tubular member 118 having an open free end 119 and an internal annular projection 120, FIGS. 5 and 6, spaced from a flat closed end 121.

The free end 85 of the rod means 84 comprises a snap-fit ball which is adapted to be pushed into the open end 119 of the tubular extension 118 of the cup-shaped member 65 and snap past the annular projection 120 thereof to be captured within the tubular member 118 between the annular rib 120 and the end wall 121 so that the movable wall 63 and the rod means 84 are snap-fitted together However, the snap-fit means 117 and 85 permit lost motion movement between the rod means 84 and the cup-shaped member 65 under certain conditions.

In particular, when an abutment means 122 of the rod-like member 84 is engaged against an exterior side 123 of the wall 71 of the housing means 36 in the manner illustrated in FIGS. 5 and 6, movement of the rod means 84 to the left in FIGS. 5 and 6 is prevented by such abutment means 122 engaging the side 123 of the wall 71. However, the cup-shaped member 65 and, thus, the movable wall 63 is adapted to move between the position in FIG. 5 wherein the movable wall 63 is disposed against the stop surface 124 of an abutment 125 of the housing means 36 to the position illustrated in FIG. 6 wherein the end surface 121 of the tubular extension 118 just abuts against the ball 85 of the rod-like member 84. Thus, it can be seen that there is a lost motion movement permitted between the position of FIGS. 5 and 6 wherein the movable wall 63 can move from the position illustrated in FIG. 6 to the position illustrated in FIG. 5 without requiring the rod-like means 84 to move to the left therewith as the same is prevented by its stop means 122 engaging the surface 123 of the wall 71.

The structure of the transmitter 20 of this invention is so designed that when the abutment 122 of the bail 84 is against the surface 123 of the wall 71 of the housing means 36 as illustrated in FIG. 5, the point 105 of the cam surface 97 is substantially superimposed on the reference point or line 110 illustrated in FIG. 5 and the movable wall 63 and compression spring 66 are so designed that the movable wall 63 will just have the end surface 121 of the tubular member 118 engage against the ball end 85 of the rod means 84 when the pressure value in the chamber 73 is approximately at the start point of approximately 3.0 psig. Thus, when the pressure value in the chamber 73 is below the start point of approximately 3.0 psig, the actuator is in the relaxed state and the compression spring 66 can force the movable wall against the stop surface 124 in the manner illustrated in FIG. 5. When the pressure value in the chamber 73 is above the start point of approximately 3.0 psig, the movable wall 63 can begin to move the rod-like member 84 to the right from the position illustrated in FIG. 6 to roll the roller 87 on the flat surface means 92 to the right and begin to wind up the cable 98 onto the cam face 97 for a purpose hereinafter set forth, the pinion gear portions 112 of the roller 87 cooperating with the rack teeth 116 of the rails 93 to prevent slipping movement between the roller 87 and the flat surface means 92 of the rails 93.

The parts of the transmitter are so dimensioned that the cam pivot points 88 lie substantially precisely in the vertical plane defined by the cable position as indicated by the reference point 110 in FIG. 5 when the stop means 122 of the rod means 84 is against the surface 123 of the wall 71 of the housing means 36 because the cam 96 should never be allowed to move past this plane in a negative direction (toward the movable wall 63) for such movement would cause a distortion in the transmitter output whereby the overrun provision or lost motion means between the snap-fit means 117 and 85 of the movable wall 63 and rod means 84 fully takes care of this problem.

In order to assure that the pivot points 89 for the pivots 88 of the roller 87 are properly aligned with the reference point 110 for the reasons previously set forth, the legs 90 of the U-shaped portion 91 of the rod means 84 can have vertically disposed notches 126 on the upper and lower portions thereof with the notches 126 being disposed in the vertical plane that passes through the openings 89 in the legs 90 and that are in alignment with the reference point or line 110.

While the snap-fit means 117 and 85 of the movable wall 63 and rod means 84 properly position the reference point 105 of the cam 96 at the reference point or line 110 as illustrated in FIG. 5, the ball joint or universal means 85 and 117 permit the rod means 84 to freely assume a required position for the roller 87 to roll on the flat surface means 92 of the rails 93 when the movable wall 63 moves further to the right from the position illustrated in FIG. 6 because of the universal joint provided by the snap-fit means 85, 117 and still have the pinion gear means 112 remain in constant mesh with the rack gears 116 whereas a rigid connection between the movable wall 63 and rod means 84 will allow for eccentric motion of the piston 65 to impart lifting, twisting and skewering motion to the rod means 84 and would not allow for proper operation thereof as will be apparent hereinafter.

By forming both the rod means 84 and cup-shaped member 65 of plastic material, it can be seen that the snap-fit means 85 and 117 can readily perform in the manner previously described while still providing the snap-fit function for securing the cup-shaped member 65 to the rod means 84 with the lost motion means therebetween.

In order to ensure that the roller 87 rolls properly on the flat surface means 92 of the rails 93, it was found according to the teachings of this invention that some means must be provided to limit backlash in the system. Accordingly, it was found that a torsion spring 127 could be provided for this purpose with such torsion spring 127 having the wound coils 128 thereof slipped over one of the pivot pins 88 and having a free end 129 disposed in a slot 129' provided in the adjacent end of pivot gear means 112 while the other free end 130 of the torsion spring 127 is disposed under the rod means 84 to be received in a notch 131, FIG. 5, so as to provide a spring force that always tends to roll the roller means 87 in a direction that would move the rod-like means 84 to the left in FIGS. 5 and 6. Such tension force continues to apply torque to the roller 87 to the left in FIG. 5 even in the relaxed condition of the transmitter 20 wherein the stop means 122 of the rod means 84 is against the surface 123 of the wall 71 of the housing means 36. In this manner, backlash in the gear teeth 112 and 116 is therefore eliminated and the rod means 84 remains in contact with the piston surface 121 throughout the entire travel of the roller 87 during the operation of the transmitter 20 when the chamber 73 has a pressure thereof above the start reference pressure of approximately 3.0 psig. This also prevents any lost motion in the pivot means 88 and pivot openings 89 of the roller 87 and rod-like member 84.

Figure 12:
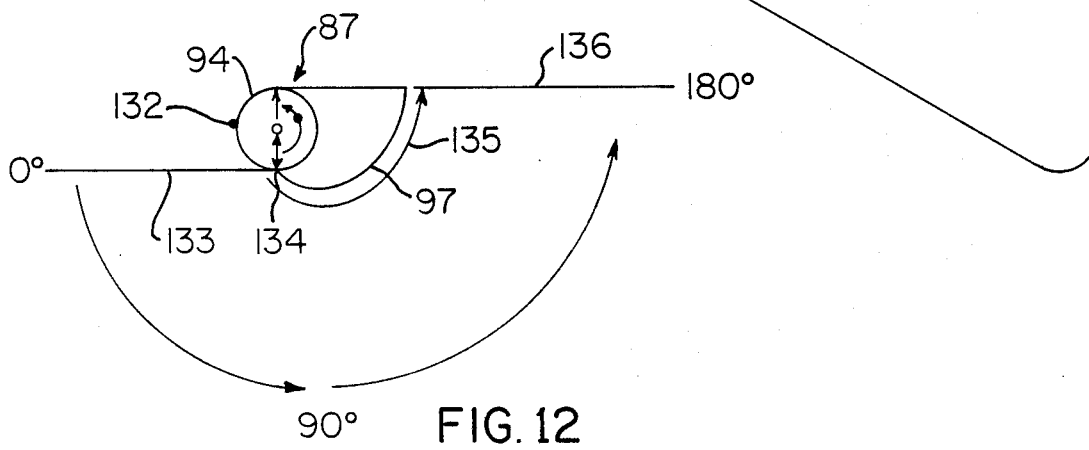
FIG. 12 is a schematic view illustrating how the cam face of the cam of the transmitter of FIGS. 1–11 is defined.

The method of defining the cam face 97 of the cam member 96 for the particular roller means 87 is to take the roller means 87 and dispose the cylindrical portion 95 on end as illustrated in FIG. 12 and an involute of the resulting circle 94 thereof may be drawn by fastening an end 132 of a non-stretching string 133 to the circle 94 and wrapping the same around the cylinder 94. Then, as the string 133 is unwrapped and while being held taut, a pencil point caught in a small knot, such as the origin point 134 illustrated in FIG. 12, will begin to draw an involute as the pencil point leaves the perimeter of the circle 94 and will continue to do so as long as the string 133 is unwound in the direction of the arrow 135. For the transmitter 20 of this invention, the "string" 133 need only be unwound about 180° as illustrated by the arrow 135 in FIG. 12. As the pencil point leaves the side of the cylinder 94 and begins to describe the arc of the involute as represented by the reference numeral 97 in FIG. 12, the length of the arc of the involute (beginning at the surface of the circle 94) is equal to one-half the radius of the circle 94 times the angle the string is unwound with the angle being in radians, squared, or the arc length equals $\frac{1}{2}re^2$ where e is measured in radians and $2\pi$ radians equals 360°.

For example, if the circle 94 is approximately 13/16ths of an inch in diameter and the length of the arc from the point of origin (134 in FIG. 12 and 105 in FIG. 10) to the end 136, FIG. 12, of the arc at 180°, then the length of the involute equals one-half (0.406 inches)·(3.14²) which equals 2.00 inches.

Thus, it can be seen that as the roller means 87 rolls on the surface means 92 of the rails 93, the edge of the cam face 97 remains at the original location 110 and continues to pull the cable 98 straight up through the reference point or line 110. Accordingly, in using such an involute to make a square root extracting transmitter, if the lateral movement of the roller means 87 is called X and the vertical movement of the cable 98 past the upper edge 92 of the plane surface 93 is called Y, then Y equals $(1/D)X^2$ where D is the diameter of the roller means 87.

Thus, it can be seen that the transmitter 20 of this invention operates in the following manner.

The differential pressure measuring means 33 senses the input signals from the standard pitot tube means 30 and produces an output signal in the passage 61 directly linear with respect to air velocity in the duct 28. This output signal may be read out on a standard pneumatic gauge (not shown) interconnected to the end of the conduit 22 which in the system 21 is actually connected to the control means 24 for controlling the damper 27.

The input signals to the transmitter 20 comprise the total pressure (velocity pressure plus static pressure) which is applied to the total pressure input connection 50 and the static pressure which is applied to the static pressure input connection 51. Since the same static pressure signal is applied both above and below the diaphragm 37, it is cancelled by the diaphragm 37 and the diaphragm 37 senses only changes in velocity pressure.

Since the velocity pressure of air varies as a constant times the square of air velocity ($Pv = KV^2$), the transmitter 20 must extract the square root from the output signal 61 as the output signal 61 is being generated for the output signal 61 to be directly proportional to changes in air velocity This is accomplished in the following manner.

As the air velocity 29 increases, the downward force of velocity pressure upon the diaphragm 37 increases causing the diaphragm 37 and its center post means 45 to move downwardly so that the end 56 of the flapper lever 57 moves the ball 60 closer to the valve seat of the outlet 54 of the bleed nozzle means 53. As the flapper lever 57 approaches the point of closing the nozzle outlet 54, the nozzle pressure increases and thereby causes the pressure in the chamber 73 of the output pneumatic signal producing means 34 to increase and to move the rod means 84 to the right in the drawings in direct proportion to the increase in the nozzle pressure produced by the flapper lever 57. This causes the roller means 87 to roll along the flat surface means 92 to the right without slippage between the roller means 87 and the surface means 92. As the roller means 87 thus rolls, the cam face 97 pulls the cable 98 vertically upwardly through the origin line 110 and, as previously stated, the direction of pull of the cam following cable 98 on the tension spring 99 remains constant. Since the cam face 97 is the involute of the circle 94 of the roller means 87, the length along the cam face 97 beginning at the perimeter point 105, FIG. 10 (or point 134, FIG. 12) and extending to the end 136 of the cam face 97 is directly proportional to the square of the distance the roller means 87 is rolled by the movement of the extending rod means 84 even though this movement is caused by a linear pressure change within the pressure to motion transmitter means 34. The amount of upward pulling motion on the tension spring 99 by the cam following cable 98 (which opposes the initial downward motion of the diaphragm 37 and flapper lever 57 caused by the increase in velocity pressure) is directly porportional to the square of the distance the roller means 87 is rolled by the extending rod means 84.

The pressure to motion transducer means 34 is made large enough so that the changing pull of the cable 98 on the cam 96 has negligible effect on the movement of the transducer rod means 84.

Therefore, the squared effect of downward force on the diaphragm 37 (caused by velocity pressure increase being proportional to the square of the velocity) is mechanically balanced by the squared effect of upward force on the diaphragm 37 applied by the linear pressure to motion transducer means 34 through the cam 96 and cable 98. Since the movement of the pressure to movement tranducer means 34 is caused by a linear increase in nozzle (and output) pressure, the transmitter output pressure in line 61 and thus in conduit means 22 to the controller 24 is directly proportional to changes in the air velocity in the duct 28.

When the differential pressure measuring means 34 senses that the air velocity 29 decreases, the downward force of velocity pressure upon the diaphragm 37 thereby decreases causing the diaphragm 37 and its center post 45 to move upwardly so that the end 56 of the flapper lever 57 moves away from the nozzle outlet 54. In this manner, the nozzle pressure decreases and thereby causes the pressure in the chamber 73 of the output pneumatic signal producing means 34 to decrease so that the rod means 84 moves to the left in the drawings by the force of the compression spring 66. This causes the roller means 87 to roll along the surface means 92 of the rails 93 to the left and unwind the cable 98 therefrom which decreases the force that the tension spring 99 applies to the diaphragm 37. Thus, the upward force of the diaphragm 37 caused by the velocity decrease is mechanically balanced by the decrease of upward force applied by the tension spring 99 as the length of the cable 98 between the cam face 97 and the tension spring 99 is increased by the roller 87 rolling to the left in the drawings. Since the movement of the rod means 84 of the transducer means 34 is caused by a linear decrease in nozzle (and output) pressure, the transmitter output pressure in passage 61 and, thus, in conduit 22 will be decreased directly proportional to the decrease in the air velocity 29 in the duct 28 in a manner that is converse to the increase in the signal pressure in the conduit 22 upon an increase in the air velocity 29 previously described.

Therefore, it can be seen that by calibrating the differential pressure transmitter 20 in a manner well known in the art, the transmitter 20 can produce a low output signal in the conduit 22 of approximately 3 psig when the roller means 87 has rolled to the left on the surface means 72 to its maximum left position where the abutment means 122 of the rod means 84 engages the stop surface 123 of the housing 36 as illustrated in FIGS. 5 and 6 and a high output signal in the conduit means 22 of approximately 15 psig when the roller means 87 has rolled to the right on the surface means 92 to its maximum right position, such left and right maximum positions being defined by the unwound and wound limits of the cable 98 on the particular cam face 97 being utilized.

As previously described, should the pressure within the chamber 73 of the signal producing means 34 fall below the start point of 3.0 psig, the movable wall 63 is driven by the compression spring 66 against the stop surface 124 of the abutment means 125 in the manner illustrated in FIG. 5 and because of the lost motion means in the snap-fit means 117 and 85, such separation of the ball 85 from the end surface 121 of the cup-shaped member 65 is permitted under these conditions and thereby avoiding stress on the rod means 84 which thereby permits the rod means 84 to be made of molded plastic material as illustrated.

Also, as previously stated, such rolling movement of the roller means 87 during the operation of the transmitter 20 operates without backlash in the system because of the torsion spring 127 maintaining the ball 85 against the end surface 121 of the cup-shaped member 65 regardless of whether the roller 87 is rolling to the right or the left in the drawings as previously set forth.

As previously stated, it is another feature of this invention to eliminate a static pressure effect in the three-diaphragm system of the pressure differential sensing means 33 of this invention.

In particular, it was found that it is desirable to have the top and bottom diaphragm seals 48 and 49 be as close as possible to having the same effective diaphragm diameters when installed in their normal positions in the transmitter 20 as any variations in assembly and part dimensions will result in varying degrss of imbalance of the sealing diaphragms 48 and 49.

In particular, the force that the main diaphragm 37 produces can equal the effective area of the diaphragm 37 times the difference between the pressure in the chamber 41 (high pressure) and the pressure in the chamber 42 (low pressure) plus the effective area of the bottom diaphragm 48 times the low pressure in the chamber 42 minus the effective area of the top diaphragm 49 times the high pressure in the chamber 41.

The above equation can be written as follows:

The total force of the diaphragm 37 equals the remainder of the effective diameter of the diaphragm 37 minus the effective area of the top diaphragm 49 times the difference between the pressure in the high pressure chamber 41 and the low pressure chamber 42 plus the effective area of the lower diaphragm 48 times the static pressure minus the effective area of the top diaphragm 49 times the static pressure where the pressure in the high pressure chamber 41 equals the difference between the high pressure in the chamber 41 and the low pressure in the chamber 42 plus the static pressure and the pressure in the lower chamber 42 equals the static pressure.

In regards to the static pressure, variations in the same ideally should not be recognized by the transmitter 20 as a signal so that the ideal transmitter 20 should respond to the following equation:

The total force of the diaphragm 37 should equal the remainder of the effective diameter of the diaphragm 37 minus the effective area of the upper diaphragm 48 times the difference in pressure between the high pressure in the chamber 41 and the low pressure in the chamber 42.

From the last two equations above, it is obvious that for the ideal conditions to exist, the effective diameter of the bottom diaphragm should equal the effective diameter of the upper diaphragm 49.

Therefore, even though the original size and shape of the diaphragms 48 and 49 are substantially identical, the effective areas thereof change when installed in their normal positions due to variations in assembly thereof and part dimensions of the transmitter 20.

However, it was found according to the teachings of this invention that the effective area of a diaphragm seal is affected by the relative position of the inner and outer peripheral portions thereof and that this effect can be used as a means of adjusting for proper seal balance.

Figure 13:
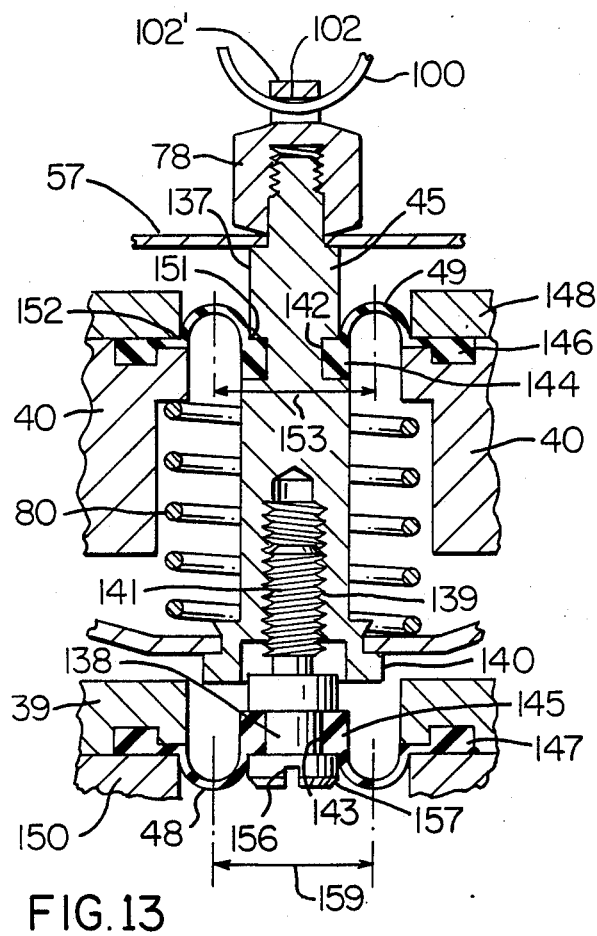
FIG. 13 is an enlarged fragmentary cross-sectional view of the post and three-diaphragm system of the transmitter of FIG. 3.
Figure 14:
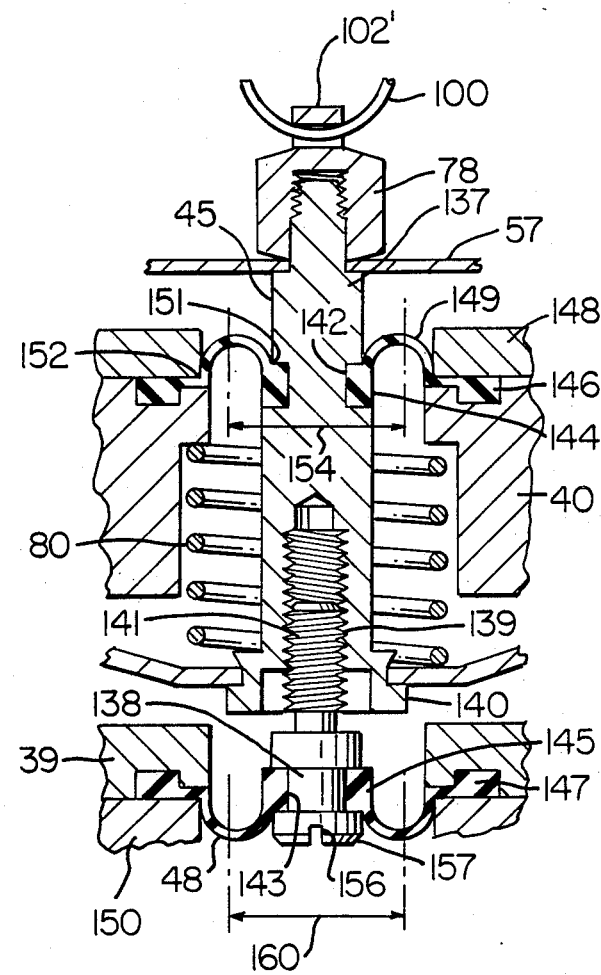
FIG. 14 is a view similar to FIG. 13 and illustrates the post means of the three-diaphragm system in a different adjusted position thereof.
Figure 15:
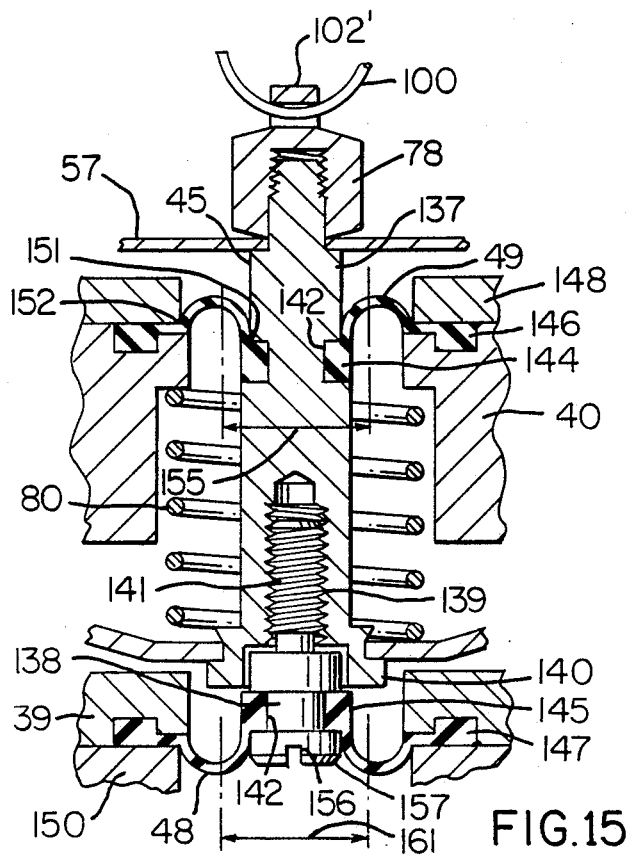
FIG. 15 is a view similar to FIG. 14 and illustrates the post means in another adjusted position thereof.

Therefore, it can be seen in FIGS. 13–15 that the post means 45 is made of two parts 137 and 138 with the two parts being made to be axially adjustable relative to each other.

In particular, the part 137 of the post means 45 has an internally threaded opening 139 formed in an end 140 thereof and the part 138 has an externally threaded portion 141 threaded into the threaded opening 139 of the part 45, the parts 137 and 138 respectively having annular grooves 142 and 143 therein which receive internal peripheral portions 144 and 145 of the diaphragms 49 and 48 therein while outer peripheral portions 146 and 147 of the diaphragms 49 and 48 are respectively held between housing parts 40, 148 and 39, 150 as illustrated.

When the transmitter 20 is first assembled, and the same is in the at rest condition thereof so that no force is being provided by the signal producing portion 34 thereof, the flapper lever 57 is held in such a position by the difference in the force of the compression spring 80 and the tension spring 99 so that a point 151 on the inner peripheral portion 142 of the upper diaphragm 49 is held in a certain relation with a point 152 on the outer peripheral portion 146 thereof to define where the effective diameter of the diaphragm 49 is under such conditions. It is believed that when the points 151 and 152 on the inner peripheral portion 144 and outer peripheral portion 146 of the diaphragm 49 are substantially in the same horizontal plane as illustrated in FIG. 13, then the mean effective diameter as indicated by the dimension 153 in FIG. 13 is approximately half-way between the points 151 and 152.

However, when the point 151 on the inner peripheral portion 144 of the diaphragm 49 is in a horizontal plane above the horizontal plane where the point 152 on the outer peripheral portion 146 of the diaphragm 49 is located as illustrated in FIG. 14, then the effective diameter of the diaphragm 48 as represented by the distance 154 in FIG. 14 is larger as the same has moved outwardly to be closer to the point 152 than toward the point 151.

Conversely, it has been found that when the upper diaphragm 49 has been initially assembled under the same conditions as illustrated in FIG. 13 and has its point 151 being in a horizontal plane below the horizontal plane of the outer peripheral point 152 as illustrated in FIG. 15, then the effective diameter 155 of the diaphragm seal 49 is smaller than the dimension 153 of FIG. 13 as the points determining the effective diameter move closer to the inner point 151 than toward the outer point 152 as illustrated in FIG. 15.

Therefore, by adjusting the post part 138 relative to the post part 137 a corresponding point 154 on the inner peripheral portion 143 of the lower diaphragm 48 can be adjusted relative to a point 155 on the outer peripheral portion 147 of the diaphragm 49 to match that of the upper diaphragm 49.

For example, the part 138 of the post means 45 can have a screwdriver receiving slot 156 in the end 157 thereof and by providing an access opening 158 in the housing part 150 as illustrated in FIG. 3, a person can adjust the threaded relation of the part 138 relative to the part 137 so that the resulting effective diameter of the diaphragm 48 can substantially match the effective diameter of the upper diaphragm 49 whereby it can be seen in FIG. 13, the effective diameter of the lower diaphragm 48 that is represented by the reference numeral 159 is substantially equal to the effective diameter 153 of the upper diaphragm 49 as the part 138 has been adjusted so that the inner and outer points 154 and 155 of the lower diaphragm 48 are in substantially the same horizontal plane since the inner and outer points 151 and 152 of the upper diaphragm 49 are in the same horizontal plane.

In FIG. 14, the part 138 of the post means 45 has been threaded away from the part 137 to cause the resulting effective diameter 160 of the lower diaphragm 48 to be substantially equal to the effective diameter 154 of the upper diaphragm 49 as the inner point 154 on the diaphragm 48 is in a horizontal plane below the horizontal plane of the outer point 155 of the diaphragm 48 in substantially the same relation as the inner and outer points 151 and 152 of the upper diaphragm 49.

Similarly, it can be seen in FIG. 15 that the part 138 has been threaded closely adjacent the part 137 to cause the effective diameter of the lower diaphragm 48 as indicated by the reference numeral 161 to be substantially equal to the effective diameter 155 of the upper diaphragm 49 as the inner point 154 on the diaphragm 48 is disposed in a horizontal plane above the horizontal plane of the outer point 155 in the same distance that the inner point 151 of the upper diaphragm 49 is below the horizontal plane of the outer point 152 of the diaphragm 49.

Thus, it can be seen that by adjusting the part 138 of the post means 45 relative to the part 137 thereof, the effective diameter of the bottom seal 48 can be adjusted to where it is equal to or very close to the effective diameter of the top diaphragm 49 and once this adjustment is made, the transmitter 20 is thereafter substantially insensitive to static pressure changes It can be seen that this method of adjusting out static pressure effects requires only one extra part and thereby is a relatively inexpensive way to solve the problem of how to adjust out static pressure effects in a three-diaphragm system.

Thus, it can be seen that this invention not only provides a new differential pressure transmitter and a new square root extracting device therefor, but also this invention provides new methods of making such a differential pressure transmitter and square root extracting device therefor.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a differential pressure transmitter comprising means for producing an output pneumatic signal from a pneumatic source in relation to the air velocity pressure of air flowing in a passage, means for sensing the difference between the total pressure and the static pressure of said air flowing in said passage, and means for extracting the square root of said air velocity pressure of said air from said pneumatic output signal as said pneumatic output signal is being produced so that said pneumatic output signal is substantially linear with respect to said air velocity of said air flow in said passage whereby said transmitter comprises a linear air velocity transmitter, said means for extracting the square root comprising a cam having a cam face that defines at least part of the involute of a circle, a roller having a surface that defines a substantially circular transverse cross-sectional configuration, said roller carrying said cam so that said cam rotates as said roller rolls on said surface thereof, a flat surface engaged by said surface of said roller so that said roller can roll on said flat surface, a movable wall carried by said transmitter and defining an output signal chamber therewith whereby the position of said wall is determined by the value of the pressure in said output signal chamber, rod means operatively interconnecting said wall to said roller to roll said roller on said flat surface as the value of said pressure in said output chamber changes, and a cable, said means for producing said output pneumatic signal comprising a bleed nozzle carried by said transmitter and a flapper lever pivotally carried by said transmitter for controlling said bleed nozzle, said means for sensing the difference between the total pressure and the static pressure comprising a housing having a pair of chambers separated from each other by a flexible diaphragm whereby one of said chambers is for receiving said total pressure therein and the other of said chambers is for receiving said static pressure therein, said flexible diaphragm having a post that is operatively interconnected to said flapper lever to transmit movement of said diaphragm to said flapper lever which will produce said output pneumatic signal with said nozzle, said cam face of said cam being operatively interconnected to said flapper lever by said cable, said cable having opposed ends one of which is operatively interconnected to said flapper lever and the other of which is secured to said cam face in such a manner that said cable is wound onto said cam face as said roller rolls on said flat surface in one direction and is unwound from said cam face as said roller rolls on said flat surface in the opposite direction to said one direction, the improvement wherein said rod means and said movable wall respectively have universal joint means snap-fitted together to provide for universal movement therebetween while movement of said wall causes said roller to roll on said flat surface, said transmitter having first stop means, said rod means having abutment means engaging said stop means when the value of said output signal is below a start point value thereof, said transmitter having a second stop means and an actuator spring operatively interconnected to said movable wall to move said movable wall against said second stop means when said transmitter is in a relaxed state thereof, said universal joint means having lost motion means therein to permit said wall to move against said second stop means after said abutment means of said rod means has engaged its respective stop means.

2. A differential pressure transmitter as set forth in claim 1 wherein said wall when moving toward said roller takes up said lost motion means before moving said rod means away from said first stop means.

3. A differential pressure transmitter as set forth in claim 2 and comprising a torsion spring operatively interconnected to said roller and said rod means to tend to roll said roller toward said wall.

4. In a pneumatically operated square root extracting device having means for extracting the square root of an input signal from an output pneumatic signal thereof and comprising a movable means for acting on a flapper lever of said device, said flapper lever controlling a bleed nozzle of said device, said device having a movable wall carried by said device and defining an output signal chamber therewith whereby the position of said wall is determined by the pressure in said output signal chamber, rod means operatively interconnecting said wall to said movable means to position said movable means relative to said flapper lever in relation to the pressure in said output signal chamber, said movable means comprising a cam operatively interconnected to said movable wall by said rod means and having a cam face that defines at least part of the involute of a circle, a roller having a surface that defines a substantially circular transverse cross-sectional configuration, said roller carrying said cam so that said cam rotates as said roller rolls on said surface thereof, a flat surface engaged by said surface of said roller so that said roller can roll on said flat surface, and a cable, said device having means for sensing the difference between one pressure and another pressure and comprising a housing having a pair of chambers separated from each other by a flexible diaphragm whereby one of said chambers is for receiving said one pressure therein and the other of said chambers is for receiving said other pressure therein, said flexible diaphragm having a post that is operatively interconnected to said flapper lever to transmit movement of said diaphragm to said flapper lever which will produce said output pneumatic signal, said cam face of said cam being operatively interconnected to said flapper lever by said cable, said cable having opposed ends one of which is operatively interconnected to said flapper lever and the other of which is secured to said cam face in such a manner that said cable is wound onto said cam face as said roller rolls on said flat surface in one direction and is unwound from said cam face as said roller rolls on said flat surface in the opposite direction to said one direction, the improvement wherein said rod means and said movable wall respectively have universal joint means snap-fitted together to provide for universal movement therebetween while movement of said wall causes said roller to roll on said flat surface, said device having first stop means, said rod means having abutment means engaging said stop means when the value of said output signal is below a start point value thereof, said device having a second stop means and an actuator spring operatively interconnected to said movable wall to move said movable wall against said second stop means when said device is in a relaxed state thereof, said universal joint means having lost motion means therein to permit said wall to move against said second stop means after said abutment means of said rod means has engaged its respective stop means.

5. A device as set forth in claim 4 wherein said wall when moving toward said roller takes up said lost motion means before moving said rod means away from said first stop means.

6. A device as set forth in claim 5 and comprising a torsion spring operatively interconnected to said roller and said rod means to tend to roll said roller toward said wall.

* * * * *